(12) United States Patent
Pusheck

(10) Patent No.: US 10,670,485 B2
(45) Date of Patent: Jun. 2, 2020

(54) PRESSURE SENSOR UNIT WITH RECTANGULAR GASKET

(71) Applicant: VEONEER US INC., Southfield, MI (US)

(72) Inventor: Jacob Pusheck, West Bloomfield, MI (US)

(73) Assignee: VEONEER US INC., Southfield, MI (US)

( * ) Notice: Subject to any disclaimer, the term of this patent is extended or adjusted under 35 U.S.C. 154(b) by 108 days.

(21) Appl. No.: 15/928,430

(22) Filed: Mar. 22, 2018

(65) Prior Publication Data

US 2019/0293513 A1 Sep. 26, 2019

(51) Int. Cl.
*G01L 19/14* (2006.01)
*G01L 19/06* (2006.01)
*G01L 19/00* (2006.01)

(52) U.S. Cl.
CPC ...... *G01L 19/0672* (2013.01); *G01L 19/0007* (2013.01); *G01L 19/0038* (2013.01); *G01L 19/0654* (2013.01); *G01L 19/14* (2013.01); *G01L 19/141* (2013.01); *G01L 19/147* (2013.01)

(58) Field of Classification Search
CPC .......................... G01L 19/0672; G01L 19/14
USPC ........................................................ 73/756
See application file for complete search history.

(56) References Cited

U.S. PATENT DOCUMENTS

| | | | |
|---|---|---|---|
| 7,377,149 B2 | 5/2008 | Ruth et al. | 73/23.31 |
| 7,412,894 B2 * | 8/2008 | Ueyanagi | G01L 19/0084 73/753 |
| 7,900,520 B2 * | 3/2011 | Colombo | G01L 19/147 257/419 |
| 8,164,007 B2 * | 4/2012 | Speldrich | B29C 45/14336 174/541 |
| 8,302,484 B2 | 11/2012 | Henzler et al. | 73/756 |
| 8,528,413 B2 | 9/2013 | Seitz et al. | 73/753 |
| 8,616,067 B2 * | 12/2013 | Wagner | G01L 19/146 73/756 |
| 8,931,348 B2 | 1/2015 | Kunert | |
| 9,360,348 B2 | 6/2016 | Henzler et al. | |
| 9,714,851 B2 | 7/2017 | Bertsch et al. | |
| 9,812,792 B2 | 11/2017 | Herrmann et al. | |
| 2013/0192361 A1 | 8/2013 | Henderich et al. | |
| 2016/0204525 A1 * | 7/2016 | Herrmann | H01R 12/714 73/431 |

FOREIGN PATENT DOCUMENTS

| | | | |
|---|---|---|---|
| DE | 102013208537 | 7/2014 | G01L 11/00 |
| EP | 2938986 | 11/2015 | G01L 10/06 |
| EP | 3270133 | 1/2018 | G01L 19/14 |

* cited by examiner

*Primary Examiner* — Jamel E Williams
(74) *Attorney, Agent, or Firm* — Christopher P. Maiorana, PC

(57) ABSTRACT

An apparatus includes a gasket and a housing assembly. The gasket may have (i) a base portion, (ii) a column portion and (iii) a passage in communication with an exterior of the apparatus. The housing assembly may have a sealing edge and may be configured to hold a sensor. The sealing edge may seal to the base portion of the gasket. The sensor (a) may seal to the column portion of the gasket and (b) may be in communication with the exterior of the apparatus through the passage.

20 Claims, 8 Drawing Sheets

PRESSURE SENSOR UNIT WITH RECTANGULAR GASKET

FIELD OF THE INVENTION

The invention relates to vehicle sensors generally and, more particularly, to a method and/or apparatus for implementing a pressure sensor unit with a rectangular gasket.

BACKGROUND

Pressure sensors conventionally operate in moisture-rich environments and therefore are sealed inside a housing. To accomplish the sealing, a gasket is commonly used with the sensor to control the environment to which the sensor is exposed. However, leaks around the gasket cause problems for the sensor measurements and communication.

It would be desirable to implement a pressure sensor unit with a rectangular gasket.

SUMMARY

The invention concerns an apparatus including a gasket and a housing assembly. The gasket may have (i) a base portion, (ii) a column portion and (iii) a passage in communication with an exterior of the apparatus. The housing assembly may have a sealing edge and may be configured to hold a sensor. The sealing edge may seal to the base portion of the gasket. The sensor (a) may seal to the column portion of the gasket and (b) may be in communication with the exterior of the apparatus through the passage.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a pressure sensor unit with a rectangular gasket that may (i) increase sealing performance compared with conventional seals, (ii) provide multiple sealing areas, (iii) include a dimple to bias a sensor in a predetermined direction, (iv) include a pneumatic passage to the sensor, (v) be cost effective, (vi) allow for interchangeable mounting configurations, (vii) incorporate one or more integrated circuits and/or (viii) be implemented using one or more plastic assembly fabrication techniques.

Embodiments of the invention generally provide a pressure sensor unit (or device) with an improved environment sealing performance. Pieces of the pressure sensor unit may be assembled using snap fit and/or plastic welded methods. The pressure sensor unit may include a base assembly and a housing assembly. A gasket within the pressure sensor unit may provide both a circular outer sealing surface (or region) and a rectangular inner sensor sealing surface (or region). A passage (or vent) in a center of the gasket generally allows a pressure signal to be transmitted to the pressure sensor from outside the pressure sensor unit.

The outer sealing surface may provide an initial barrier between an exterior environment and a pressure sensor inside the pressure sensor unit. The outer sealing surface generally provides an annular compression surface (or region) to engage a sealing portion of the housing assembly. The outer sealing surface may include an angled surface (or region) against which the sealing surface also mates. The angled outer surface generally provides an increased surface-to-surface area to prevent contamination (e.g., water) intrusion. The angled surface may result in smaller high-pressure contact areas where the sealing portion engages the gasket. The angled surface may also increase a sealing force as a pressure differential rises, thereby making the seal more reliable.

The sensor sealing surface of the gasket may provide one or more additional barriers between the exterior environment and an active side of the pressure sensor. The sensor sealing surface may be raised relative to the surrounding outer sealing surface of the gasket. The raised sensor sealing surface generally provides extra compression on the sensor to provide electrical connection as well as deformation that wraps around the sensor thereby creating an additional seal. An optional dimple on a face of the raised sensor sealing surface may provide additional force to ensure proper orientation of the sensor against a set of electrical contacts. The raised portion of the gasket may also include an optional rib that forms another sealing surface. An optional groove in a central portion of the gasket may provide still another sealing surface.

Figure 1:
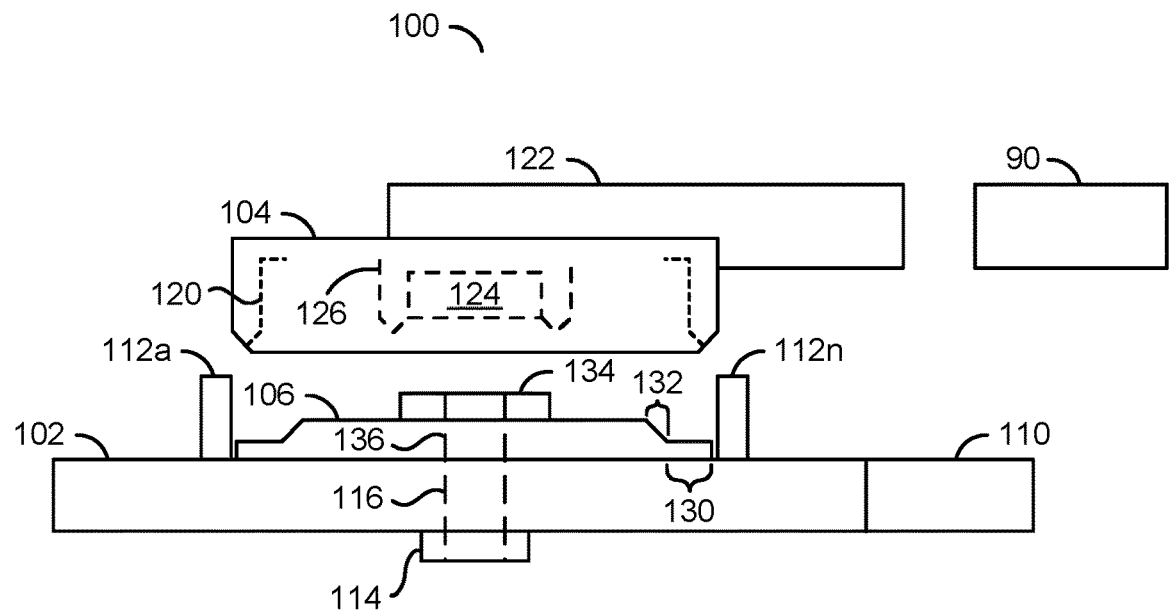
FIG. 1 is a diagram illustrating a sensor unit in accordance with an embodiment of the invention.

Referring to FIG. 1, a diagram illustrating an example implementation of a sensor unit 100 is shown in accordance with an embodiment of the invention. The sensor unit (or apparatus, or system, or device) 100 generally implements a gas pressure sensor suitable for use in automotive applications. The sensor unit 100 generally comprises a base assembly 102, a housing assembly 104, and a gasket 106.

The base assembly 102 may include a mounting feature 110, multiple tabs 112a-112n and an optional coupler 114. A passage 116 may be formed through the base assembly 102 and the coupler 114. The base assembly 102 may be formed of a hard plastic material and has a generally circular shape. The materials used to fabricate the base assembly 102 may include, but are not limited to, polybutylene terephthalate (PBT) and nylon, and are usually glass filled. The base assembly 102 may be fabricated by injection molding.

The mounting feature 110 may be implemented as a mounting boss. The mounting feature 110 may secure the pressure sensor unit 100 to a structure of a motor vehicle (e.g., automobile, truck, train and the like). The mounting feature 110 may be customized to meet the mounting criteria of a particular application. The uniqueness of the mounting feature 110 may result in a family of base assemblies 102. The housing assembly 104 may be interchangeable among different styles of base assemblies 102. Each type of base assembly 102 may have a common set of features to connect with a single type of housing assembly 104, and a unique set of features to account for the different installation criteria.

The tabs 112a-112n may implement snap-on tabs. The tabs 112a-112n may form a ring around the gasket 106. The tabs 112a-112n are generally operational to engage (e.g., snap to) the housing assembly 104. In various embodiments, the snapping (or locking) may not be reversible. In other embodiments, the tabs 112a-112n may be configured to both engage with and disengage from the housing assembly 104 a number of times.

The coupler 114 may implement an optional gas coupler (or fitting). Where implemented, the coupler 114 may provide a surface to connect a hose or pipe containing the gas pressure signal to be measured by the pressure sensor unit 100. In various embodiments, the coupler 114 may be eliminated where the pressure sensor unit 100 is measuring the surrounding environmental pressure.

The housing assembly 104 may include an annular sealing edge 120, a connector 122 and an optional inner sealing edge 126. The housing assembly 104 may be formed of the same hard plastic material used to create the base assembly 102. The sealing edge 120 may be configured to form an environmental seal with the gasket 106 while the housing assembly 104 is mated to the base assembly 102. The sealing edge 120 may also be configured to engage with the tabs 112a-112n to hold the housing assembly 104 to the base assembly 102. The inner sealing edge 126 may be configured to form one or more environmental seals with a central region of the gasket 106. The connector 122 may be configured to connect to an external harness with an electrical connector 90 to convey electrical power and electrical signals.

The housing assembly 104 may support a pressure sensor 124. The pressure sensor 124 may be configured to sense a gas (or pneumatic or air) pressure signal received through the passage 116 of the base assembly 102 and another passage through the gasket 106. The pressure sensor 124 is generally operational to convert a measured gas pressure into an electrical signal. The pressure sensor 124 may be fabricated as one or more integrated circuits. Electrical power for the pressure sensor 124 may be received through the connectors 90 and 122. Measured data generated by the pressure sensor 124 may be transferred out of the pressure sensor unit 100 through the connectors 122 and 90.

The gasket 106 is generally symmetrical in shape. In various embodiments, (see FIG. 2), the gasket 106 generally comprises a passage (or vent) 136, a base portion 140, a column portion 142, a face 144 of the column portion 142, an optional dimple 146, an optional rib 148 and an optional groove 150. In some embodiments (see FIG. 1), the gasket 106 generally comprises a compression (or annual) region 130, a sloped (or angled) region 132 and a central (or raised) region 134. The passage 136 may extend through the gasket 106, including the central region 134.

The compression region 130 generally extends around an outer perimeter of the gasket 106. The sloped region 132 may extend around the gasket 106 inside the compression region 130. The angled surface of the sloped region 132 may increase a sealing force as a pressure differential rises, thereby making the seal more reliable.

The central region 134 may be offset perpendicular to the compression region 130 projected toward the sensor 124. The central region 134 generally has a rectangular shape. An open face of the central region 134 may align and seal to the sensor 124 while the housing assembly 104 is connected to the base assembly 102.

The passage 136 may be aligned at one end with the passage 116 in the base assembly 102. The passage 136 may be aligned at the opposite end with an active side of the pressure sensor 124. In various embodiments, the gasket 106 may be fabricated from a resilient material. The gasket 106 may be fabricated using a two-shot injection molding onto the base assembly 102, fabricated separately and subsequently placed on the base assembly 102, or fabricated by any common techniques. Material for the gasket 106 may include, but is not limited to silicone-based material, thermoplastic elastomers (TPE) material and thermoplastic rubber material. Other materials may be implemented to meet the design criteria of a particular application. An overall thickness of the gasket 106 may range from approximately 2 millimeters (mm) to approximately 5 mm. Additional details about the pressure sensor unit 100 may be found in co-pending U.S. application Ser. No. 15/924,896, filed Mar. 19, 2018, which is hereby incorporated by reference in its entirety.

Figure 2:
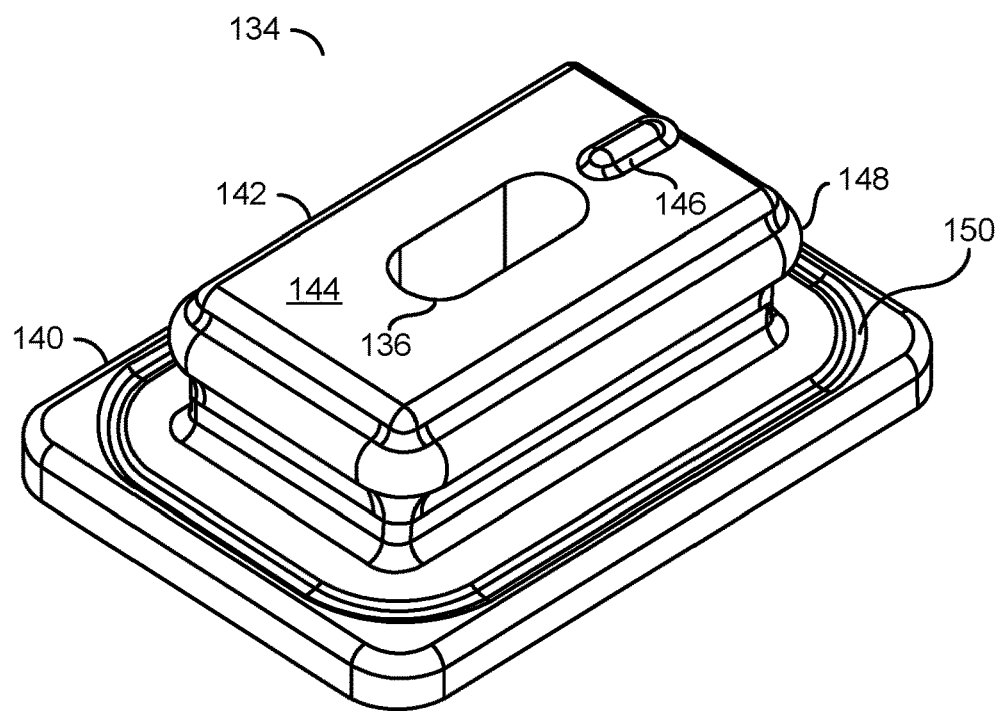
FIG. 2 is a diagram illustrating a gasket of the sensor unit in accordance with an embodiment of the invention.

Referring to FIG. 2, a diagram illustrating an example implementation of the central region 134 of the gasket 102 is shown in accordance with an embodiment of the invention. The central region 134 generally comprises the base portion 140 and the column portion 142. The column portion 142 may have a smaller cross-sectional area than the base portion 140, as shown. In various embodiments, the face (or surface) 144 of the column portion 142 may have dimensions larger than a matching surface of the sensor 124. The passage 136 may extend through the base portion 140, the column portion 142 and is exposed at the face 144. The dimple 146 may be included on the face 144 to help bias the sensor 124 against supports and electrical connectors within the housing assembly 104. Additional details of the biasing of the sensor 124 may be found in co-pending U.S. application Ser. No. 15/938,667, filed Mar. 28, 2018, which is hereby incorporated by reference in its entirety. An optional rib 148 may be provided circumventing the column portion 142. The rib 148 may be located between the face 144 and the base portion 140. An optional groove 150 may be provided in the base portion 140. The groove 150 may circle the column portion 142. In some embodiments, the gasket 106 may be implemented as only the central region 134.

Figure 3:
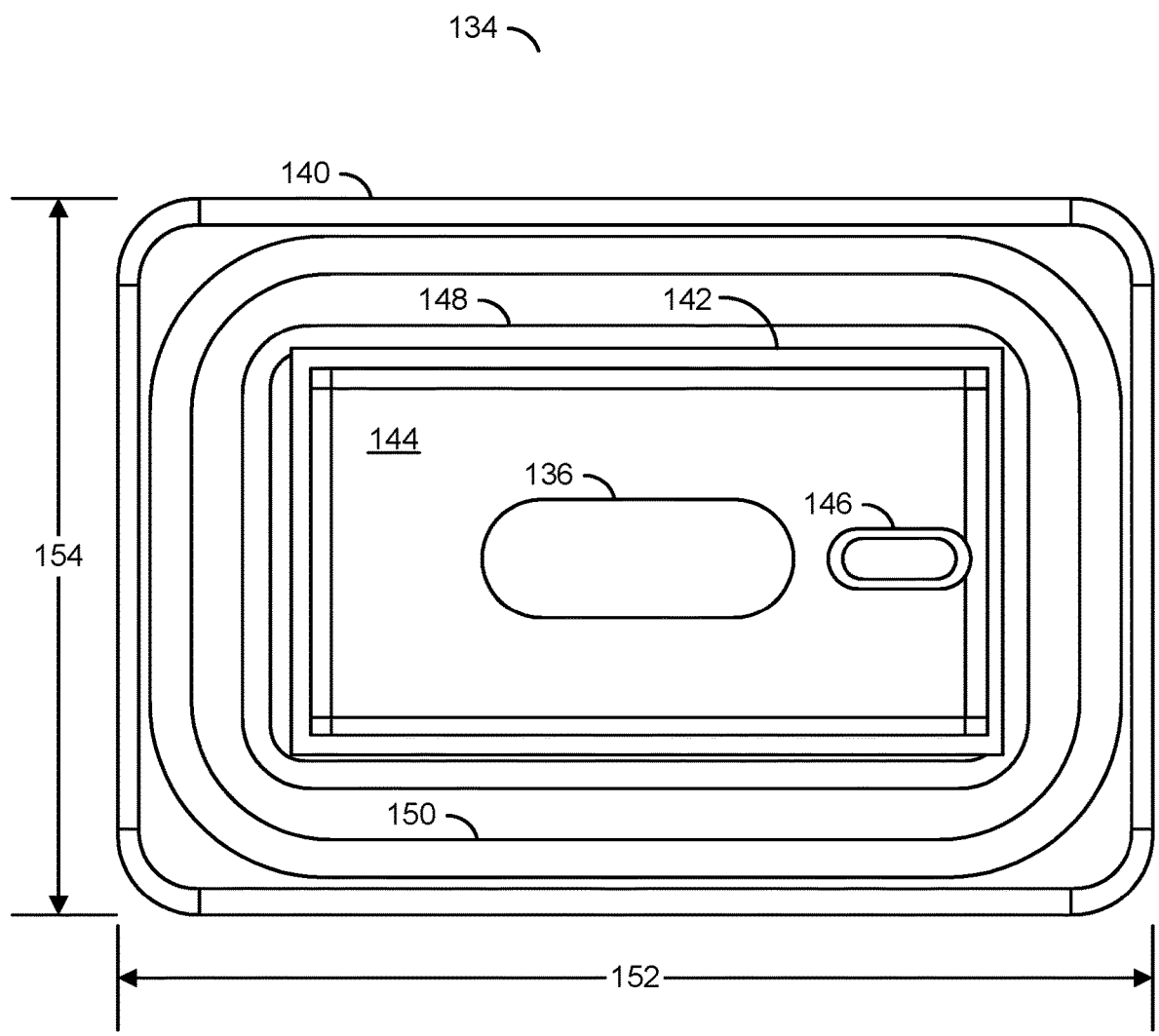
FIG. 3 is a diagram illustrating a top view of the gasket in accordance with an embodiment of the invention.

Referring to FIG. 3, a diagram illustrating a top view of the central region 134 of the gasket 106 is shown in accordance with an embodiment of the invention. The passage 136 may be centered on the base portion 140 and the column portion 142. The dimple 146 is generally disposed between the passage 136 and an outer edge of the column portion 142. The rib 148 generally protrudes outward from the column portion 142.

In various embodiments, the base portion 140 of the central region 134 may have dimensions of (i) approximately 6 millimeters (mm) to approximately 12 mm by (ii) approximately 4 mm to approximately 6 mm. A thickness of the base portion 140 may range from approximately 1 mm to 2 mm. The column portion 142 of the central region 134 may have dimensions of (i) approximately 4 millimeters (mm) to approximately 8 mm by (ii) approximately 2 mm to approximately 4 mm. A total thickness of the central region 134 may be in a range from approximately 2 mm to approximately 4 mm. A total thickness of the central region 134 (e.g., a thickness of the base portion 140 and the column portion 142) may range from approximately 2 mm to 5 mm. Other dimensions may be implemented to meet the design criteria of a particular application.

Figure 4:
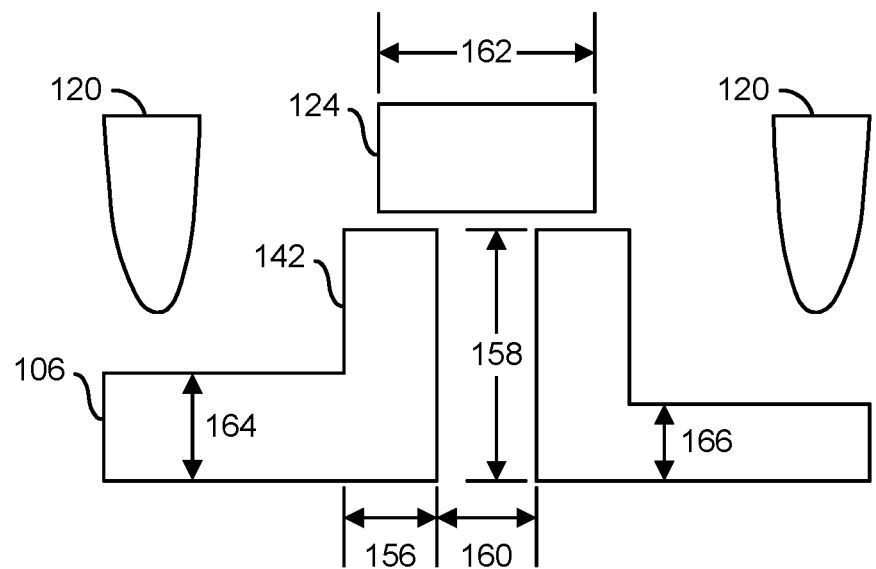
FIG. 4 is a diagram illustrating a side view of the gasket in accordance with an embodiment of the invention.

Referring to FIG. 4, a diagram illustrating parameters of a two-dimensional simulation of the central region 134 of the gasket 106 when compressed by the sensor 124 is shown in accordance with an embodiment of the invention. The column portion 142 in the two-dimensional simulations may have a wall dimension 156 in width and a wall dimension 158 in height. The passage 136 may have a dimension 160 in width. The sensor 124 may have a dimension 162 in width. The simulations 180 (FIG. 5), 200 (FIG. 6) and 220 (FIG. 7) may be based on the dimension 156 at 2.25 mm, the dimension 158 at 3 mm, the dimension 160 at 1.5 mm, and the dimension 162 at 4.4 mm. Material thicknesses 164 and 166 on either side of column portion 142 may be simulated with different thicknesses. In particular, the simulations generally have the thickness 164 greater than the thickness 166 to illustrate an impact of the material thickness on the deformation, elastic strain and pressure.

Figure 5:
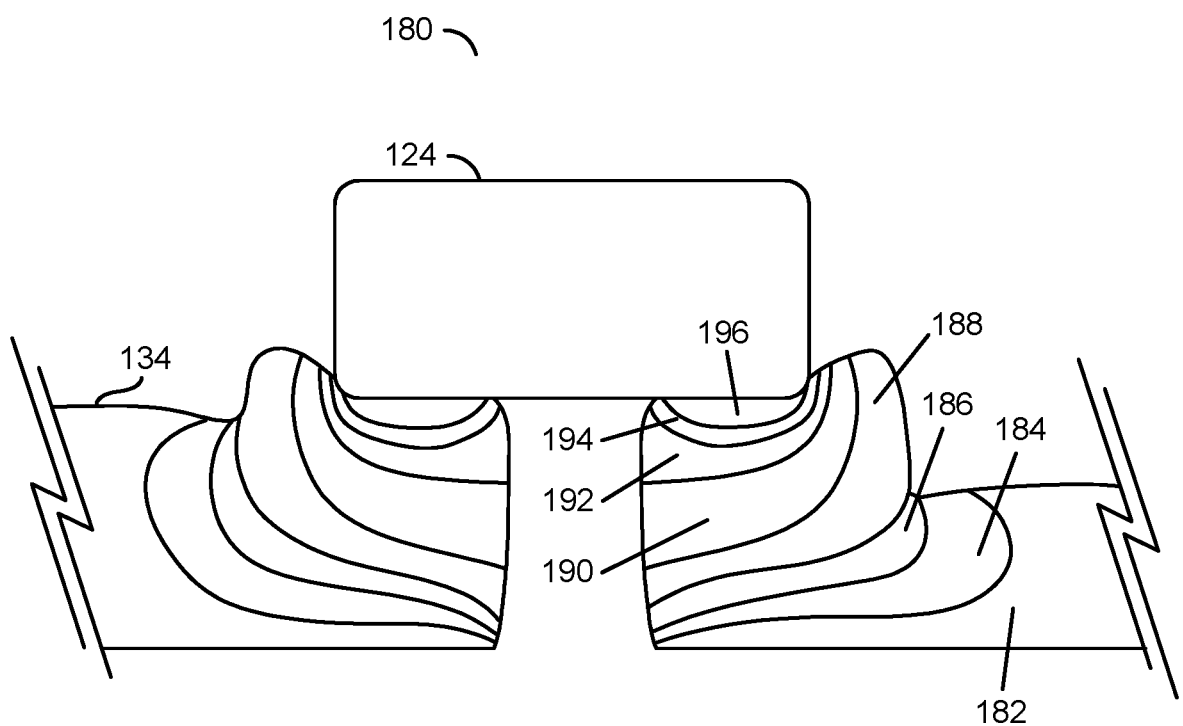
FIG. 5 is a diagram illustrating a two-dimensional simulation of a total deformation in the gasket in accordance with an embodiment of the invention.

Referring to FIG. 5, a diagram illustrating a two-dimensional simulation 180 of a total deformation in the central region 134 of the gasket 106 when compressed by the sensor 124 is shown in accordance with an embodiment of the invention. The simulated deformation is generally illustrated in units of millimeters (mm).

The deformation in an area 182 generally ranges from zero mm to approximately 0.046 mm. Within an area 184, the deformation may range from approximately 0.046 mm to approximately 0.092 mm. The deformation in an area 186 may range from approximately 0.092 mm to approximately 0.140 mm. In an area 188, the deformation may range from approximately 0.140 mm to approximately 0.232 mm. In an area 190, the deformation may range from approximately 0.232 mm to approximately 0.325 mm. The deformation in an area 192 may be from approximately 0.325 mm to approximately 0.557 mm. In an area 194, the deformation may range from approximately 0.557 mm to approximately 0.65 mm. Compression of the sensor 124 into the central region 134 may cause a face of the column portion 140 to wrap around the engaged corners of the sensor 124. The wrapping generally increases a sealing area between the sensor 124 and the central region 134. The simulations generally show that the maximum deformation is within specified limits.

Figure 6:
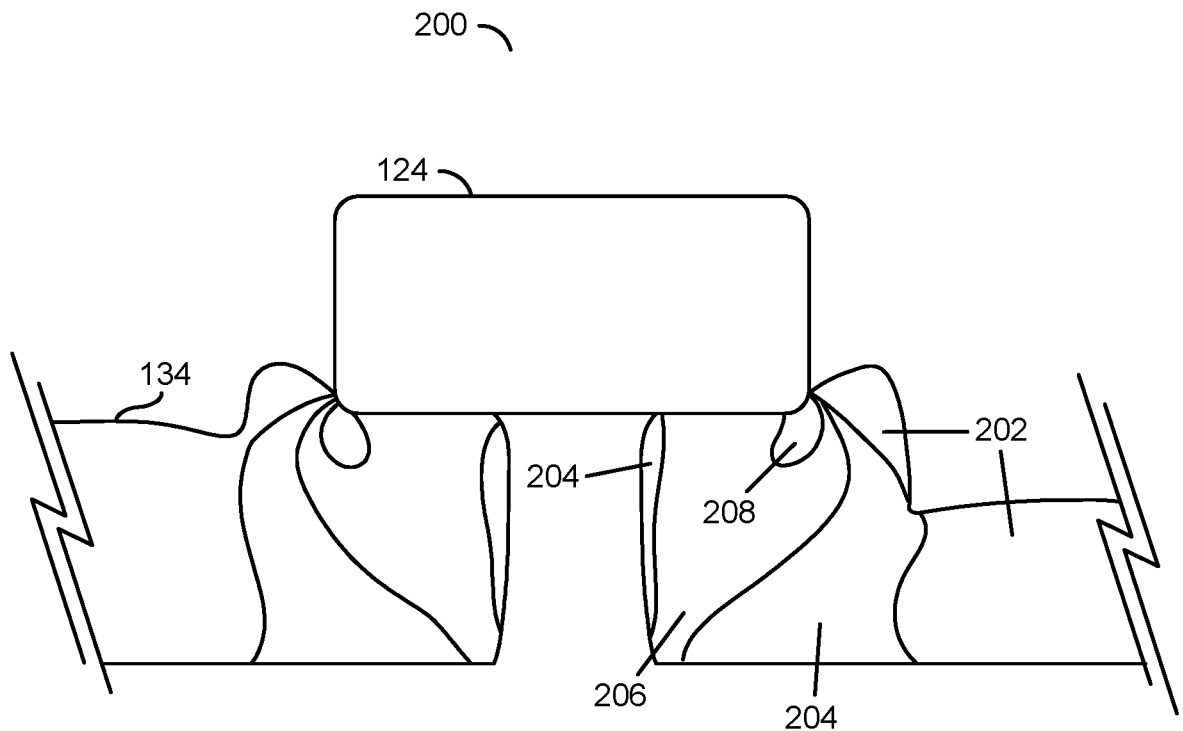
FIG. 6 is a diagram illustrating a two-dimensional simulation of an equivalent elastic strain in the gasket in accordance with an embodiment of the invention.

Referring to FIG. 6, a diagram illustrating a two-dimensional simulation 200 of an equivalent elastic strain in the gasket 106 when compressed by the sealing edge 120 is shown in accordance with an embodiment of the invention. The simulated elastic strain is generally illustrated in units of millimeters per millimeter (mm/mm).

The elastic strain in an area 202 generally ranges from zero mm/mm to approximately 0.113 mm/mm. Within an area 204, the elastic strain may range from approximately 0.113 mm/mm to approximately 0.226 mm/mm. The elastic strain in the area 206 may range from approximately 0.226 mm/mm to approximately 0.339 mm/mm. In an area 208, the elastic strain may range from approximately 0.339 mm/mm to approximately 0.452 mm/mm. Strain between the sensor 124 and the central region 134, as illustrated, is generally uniform where the sensor 124 contacts the central region 134. The simulations generally show that the maximum elastic strain is within specified limits.

Figure 7:
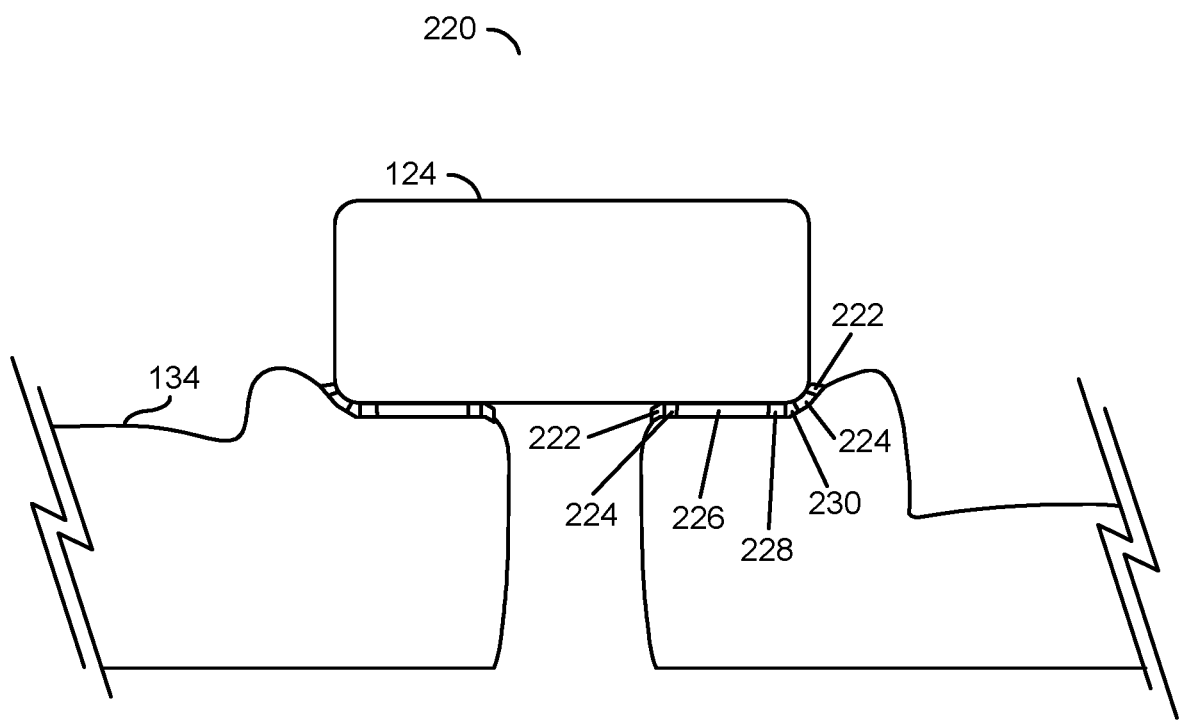
FIG. 7 is a diagram illustrating a two-dimensional simulation of a pressure between the sensor and the gasket in accordance with an embodiment of the invention.

Referring to FIG. 7, a diagram illustrating a two-dimensional simulation 220 of a pressure between the sensor 124 and the gasket 106 is shown in accordance with an embodiment of the invention. The simulated pressure is generally illustrated in units of megapascals (MPa).

In an area 222, the pressure may range from zero MPa to approximately 0.003 MPa. The pressure may range from approximately 0.003 MPa to approximately 0.006 MPa in the area 224. The pressure may range from approximately 0.006 MPa to approximately 0.012 MPa in the area 226. In the area 228, the pressure may range from approximately 0.012 MPa to approximately 0.015 MPa. Pressures from approximately 0.015 MPa to approximately 0.021 MPa may be illustrated in the area 230. The simulation 220 generally shows a consistent pressure where the sensor 124 engages the central region 134. The consistent pressure may be useful in maintaining a seal between the sensor 124 and the gasket 106. The pressure is generally above a minimum pressure parameter specified to maintain a seal during a sudden pressure rise event.

Figure 8:
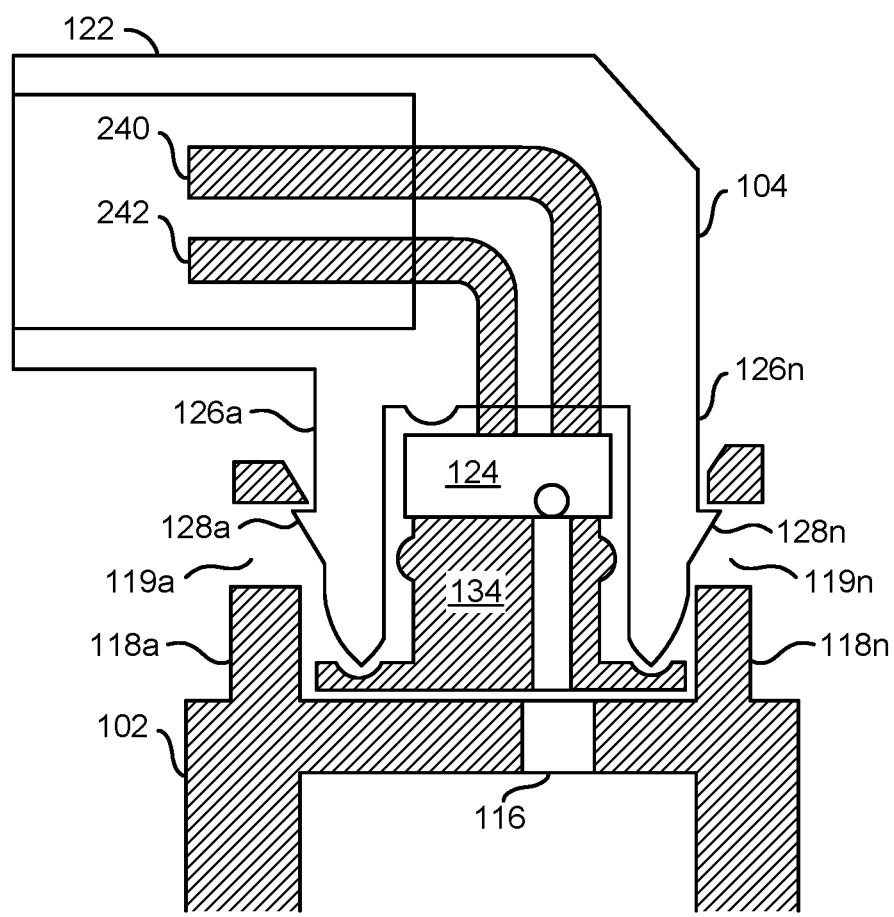
FIG. 8 is a diagram illustrating a central region of the gasket in accordance with an embodiment of the invention.

Referring to FIG. 8, a diagram illustrating an example design involving just the central region 134 of the gasket 106 is shown in accordance with an embodiment of the invention. The base assembly 102 may include multiple tabs 118a-118n. One or more of the tabs 118a-118n may include an opening 119a-119n. The inner sealing edge 126 of the housing assembly 104 may be implemented as multiple inner sealing edges 126a-126n. One or more of the inner sealing edges 126a-126n may include a tooth 128a-128n that engages the corresponding openings 119a-119n to lock the housing assembly 104 to the base assembly 102. Electrical connectors 240 and 242 may be included in the housing assembly 104 to provide electrical power to the sensor 124 and convey data generated by the sensor 124 to an electronic control unit.

Figure 9:
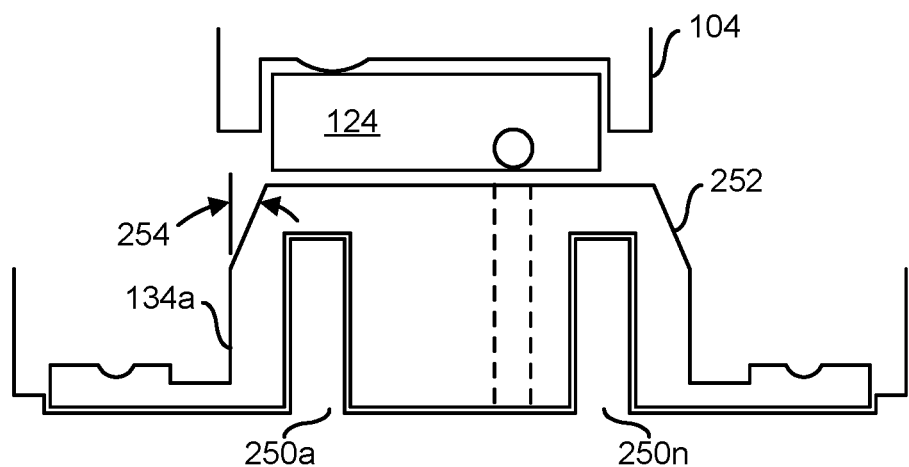
FIG. 9 is a diagram illustrating another central region of the gasket in accordance with an embodiment of the invention.

Referring to FIG. 9, a diagram illustrating an example design of another central region 134a of the gasket 106 is shown in accordance with an embodiment of the invention. The central region 134a may be a variation of the central region 134. The central region 134a may include slots for multiple embedded posts 250a-250n and an angled portion 252.

The embedded posts 250a-250n may be aligned with the outer edges of the sensor 124. The embedded posts 250a-250n may be operational to provide additional support (or stiffness) in the central region 134a. In various embodiments, the embedded posts 250a-250n may be fabricated from plastic as part of the base assembly 102 and the central region 134a of the gasket 106 formed around the posts 250a-250n. In some embodiments, the embedded posts 250a-250n may be fabricated as part of the gasket 106 prior to mounting to the base assembly 102.

The angled portion 252 may expand the size of the central region 134a to accommodate the embedded posts 250a-250n. The angled portion 252 may be formed at an angle 254 in a range of 5 degrees to 60 degrees as measured from a wall of the central region 134a. Other angles may be implemented to meet the design criteria of a particular application.

Figure 10:
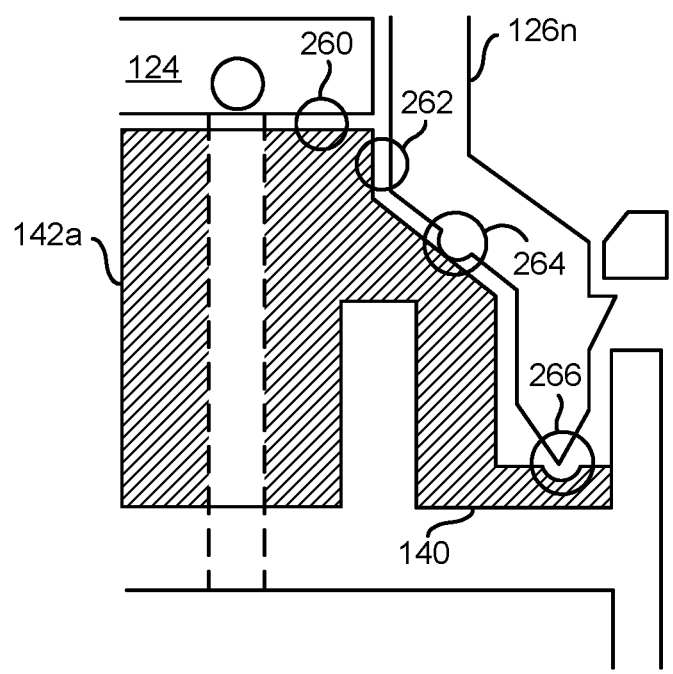
FIG. 10 is a diagram illustrating a partial view of the central region of FIG. 9 in accordance with an embodiment of the invention.

Referring to FIG. 10, a diagram illustrating a partial view of the central region 134a is shown in accordance with an embodiment of the invention. Multiple seal areas 260-266 may be created between the housing assembly 104 and the base assembly 102. The sensor 124 may produce a seal area 260 to the open face 144 of a column portion 142a. Portions of the inner sealing edges 126a-126n may produce additional seal areas 262, 264 and 266 with the column portion 142a.

The seal area 262 may be created by a bend portion of the inner sealing edges 126a-126n engaging the outer walls of the column portion 142a near the free end of the column portion 142a. The free end of the column portion 142a may have slightly larger dimensions than the spacing of the inner sealing edges 126a-126n. As the inner sealing edges 126a-126n are moved toward the base assembly 102 (downward in the figure), the inner sealing edges 126a-126n may contact and compress the gasket material in the column portion 142a thereby forming the seal area 262. Each inner sealing edge 126a-126n may include a ridge (or rib) facing inward toward the angled portion 252. The ridge may contact and compress the angled portion 252 to form the seal area 264. The ends of the inner sealing edges 126a-126n may provide the seal area 266 with the groove in the base portion 140.

Figure 11:
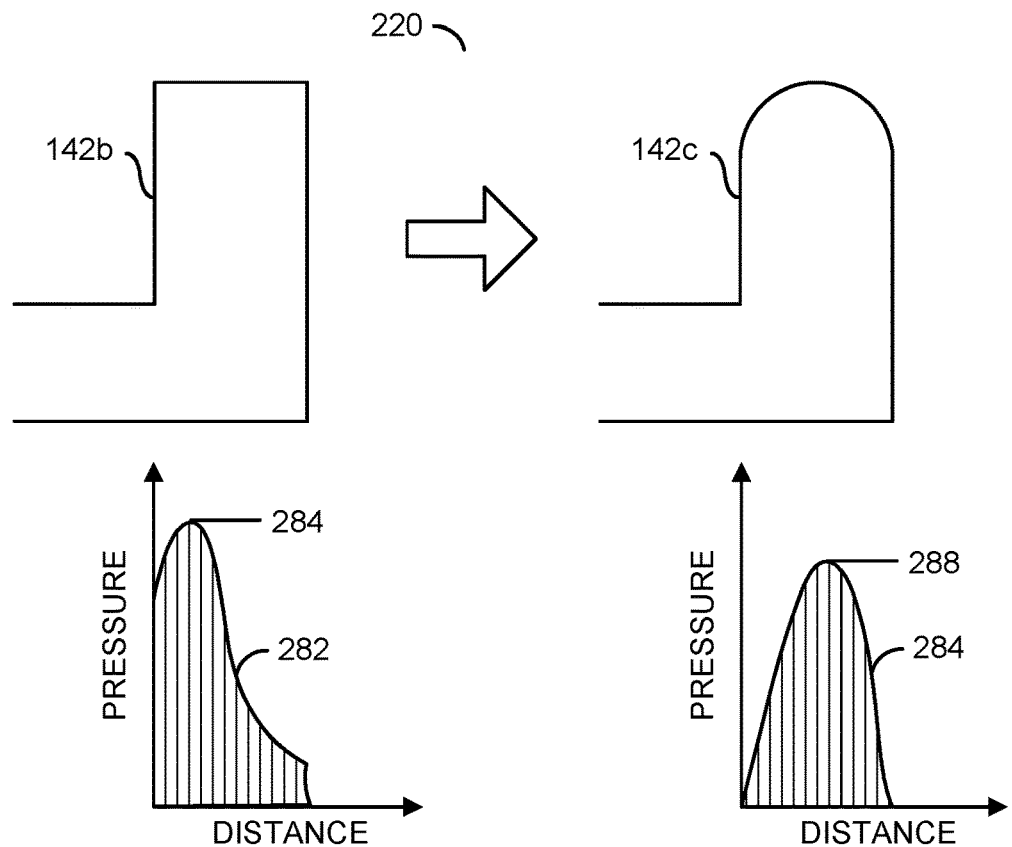
FIG. 11 is a diagram illustrating simulated pressures for various shapes of column portions in accordance with an embodiment of the invention.

Referring to FIG. 11, diagrams 280 illustrating an example of simulated pressures for various shapes of column portions is shown in accordance with an embodiment of the invention. A column portion 142b may have a squared-off free end. A resulting pressure distribution 282 created by the sensor 124 being compressed onto the free end may have a high peak pressure 284 near the outer edges of the sensor 124. A column portion 142c may have a rounded profile at the free end. A resulting pressure distribution 286 created by the sensor 124 being compressed onto the free end may have a high peak pressure 288 nearer the center of the sensor 124 as compared with the pressure distribution 282.

Figure 12:
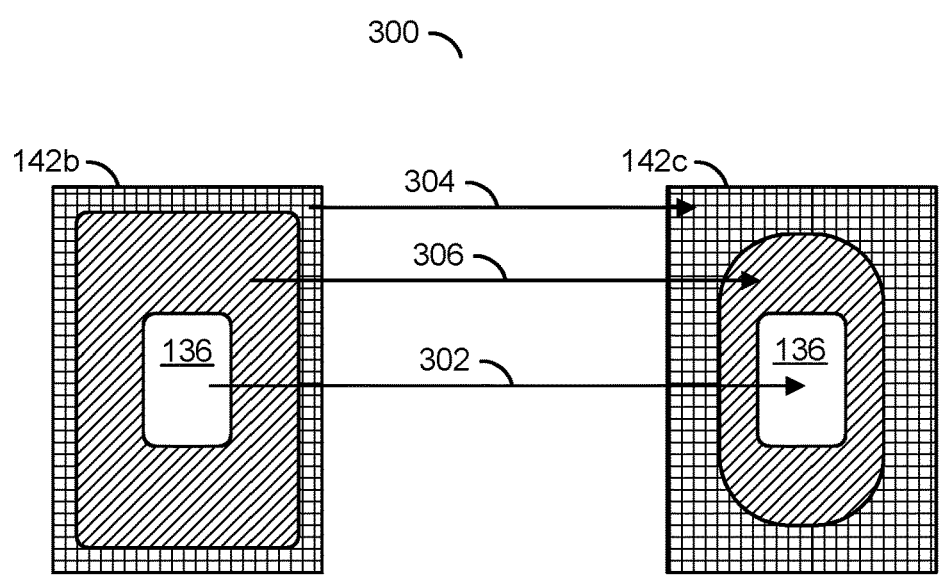
FIG. 12 is a diagram illustrating a top view of the simulated pressures from FIG. 11 in accordance with an embodiment of the invention.

Referring to FIG. 12, diagrams 300 illustrating a top view of the simulated pressures from FIG. 11 is shown in accordance with an embodiment of the invention. The column portions 142b and 142c may both experience low (e.g., zero) pressure in the area of the passage 136. The column portion 142b may experience the high pressure 304 in a narrow band around a periphery where the sensor 124 compresses the gasket material. The area between the high pressure 304 and the low pressure 302 may experience a range of intermediate pressures 306. By curving the free end, the column portion 142c may experience the high pressure 304 over a larger band around the periphery. An area of the intermediate pressures 306 may be reduced to a smaller area around the passage 136. As a result, the column portion 142c may provide a more robust seal to the sensor 124 than the column portion 142b.

Figure 13:
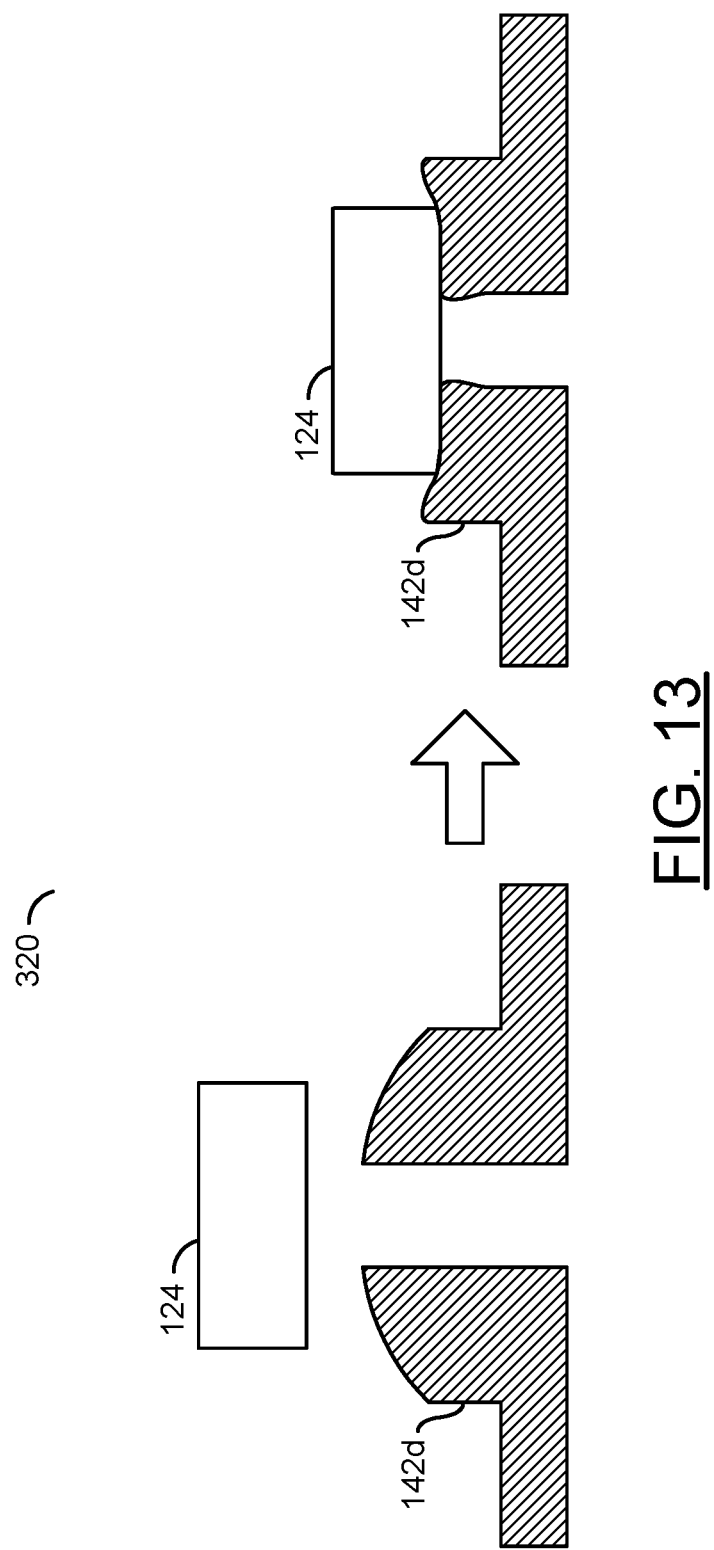
FIG. 13 is a diagram illustrating a curved free end of a column portion in accordance with an embodiment of the invention.

Referring to FIG. 13, a diagram 320 illustrating an example design of a curved free end of a column portion 142d is shown in accordance with an embodiment of the invention. The column portion 142d may be a variation of the column portion 142c. Prior to compressing the sensor 124 with the column portion 142d (e.g., left side of the diagram 320), the column portion 142d may have a curved profile 322 that is taller nearer a center of the column portion 142d. After the sensor 124 and the column portion 142d are compressed (e.g., right side of the diagram 320), the sensor 124 may essentially flatten the free end of the column portion 142d. The resulting seal between the sensor 124 and the column portion 142d may maintain a high pressure over a significant portion of the sensor face thereby provide a good seal.

The structures illustrated in the diagrams of FIGS. 1 to 13 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Data signals generated by the sensor units (or devices) may be transferred to one or more electronic control units. The electronic control units may utilize the sensor data in one or more transport vehicle functions including, but not limited to, engine control, transmission control, braking control, battery management, steering control, door control, human machine interface, seat control, speed control, restraint systems control, vehicle-to-vehicle communications and diagnostics. The electronic control units may include capabilities to adjust the sensor data to account for calibration issues, environmental factors and aging components.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a gasket having (i) a base portion, (ii) a column portion and (iii) a passage in communication with an exterior of said apparatus, wherein said column portion comprises a slot with an embedded support configured to stiffen said column portion; and
   a housing assembly having a sealing edge and configured to hold a sensor, wherein (i) said sealing edge seals to said base portion of said gasket, and (ii) said sensor (a) seals to said column portion of said gasket and (b) is in communication with said exterior of said apparatus through said passage.

2. The apparatus according to claim 1, wherein (i) said gasket has a rectangular shape and (ii) said sensor comprises a gas pressure sensor.

3. The apparatus according to claim 1, wherein said sensor measures an air pressure inside a motor vehicle.

4. The apparatus according to claim 1, further comprising a rib (i) located about said column portion and (ii) configured to seal to an inside surface of said sealing edge.

5. The apparatus according to claim 1, further comprising a groove (i) in said base portion and (ii) configured to seal to said sealing edge.

6. The apparatus according to claim 1, further comprising a dimple (i) disposed on said column portion and (ii) configured to bias said sensor into said housing assembly.

7. The apparatus according to claim 1, wherein said embedded support comprises a plurality of posts fabricated as part of a base assembly or part of said column portion of said gasket.

8. The apparatus according to claim 1, wherein (i) said column portion comprises an angled portion and (ii) said angled portion is configured to seal to an inside surface of said sealing edge.

9. The apparatus according to claim 8, wherein said sealing edge further comprises a ridge configured to seal to an outside surface of said column portion.

10. The apparatus according to claim 1, wherein said sealing edge further comprises a bend portion configured to seal to said column portion.

11. The apparatus according to claim 1, wherein a face of said column portion that seals to said sensor is curved prior to being compressed by said sensor.

12. The apparatus according to claim 11, wherein said face is approximately flat while being compressed by said sensor.

13. The apparatus according to claim 1, further comprising a base assembly comprising (i) a surface to support said gasket and (ii) a mounting feature configured to be attached to a structure.

14. The apparatus according to claim 1, wherein said sealing edge imposes a deformation of no greater than approximately 0.65 millimeters in said column portion.

15. The apparatus according to claim 1, wherein said sealing edge imposes an elastic strain of no greater than approximately 0.45 millimeters per millimeter in column portion.

16. The apparatus according to claim 1, wherein said sealing edge imposes a pressure of no greater than approximately 0.021 megapascal on said column portion.

17. An apparatus comprising:
a base assembly having (i) a first passage in communication with an exterior of said apparatus, (ii) a mounting feature configured to be attached to a structure, and (iii) a support surface;
a gasket disposed on said support surface of said base assembly and having (i) a base portion, (ii) a column portion and (iii) a second passage aligned with said first passage; and
a housing assembly having a sealing edge and configured to hold a sensor, wherein (i) said sealing edge seals to said base portion of said gasket, and (ii) said sensor (a) seals to said column portion of said gasket and (b) is in communication with said exterior of said apparatus through said first passage and said second passage.

18. The apparatus according to claim 17, wherein (i) said gasket has a rectangular shape and (ii) said sensor comprises a gas pressure sensor configured to measure an air pressure inside a motor vehicle.

19. An apparatus comprising:
a gasket having (i) a base portion, (ii) a column portion and (iii) a passage in communication with an exterior of said apparatus; and
a housing assembly having a sealing edge and configured to hold a sensor, wherein (i) said sealing edge seals to said base portion of said gasket, and (ii) said sensor (a) seals to said column portion of said gasket, (b) is in communication with said exterior of said apparatus through said passage, and (c) measures an air pressure inside a motor vehicle.

20. The apparatus according to claim 19, wherein said gasket comprises angled portion is configured to seal to an inside surface of said sealing edge.

* * * * *